US008678497B2

(12) United States Patent
Kyogoku et al.

(10) Patent No.: US 8,678,497 B2
(45) Date of Patent: Mar. 25, 2014

(54) SEATING ARRANGEMENT FOR A VEHICLE (75) Inventors: Osamu Kyogoku, Dublin, OH (US);
Rudy M. Mayne, Jr., Hilliard, OH (US);
Spyro G. Blatseas, Dublin, OH (US);
William Charles Lanz, Dublin, OH (US); Mark D. Herbert, Baldwin, NY (US); Wataru Takayasu, New Albany, OH (US); J. Zachary Sorrell, Columbus, OH (US)

(73) Assignees: Honda Motor Co., Ltd., Tokyo (JP); TS Tech Co., Ltd., Tokyo (JP)

( * ) Notice: Subject to any disclaimer, the term of this patent is extended or adjusted under 35 U.S.C. 154(b) by 227 days.

(21) Appl. No.: 13/194,483

(22) Filed: Jul. 29, 2011

(65) Prior Publication Data
US 2012/0049589 A1   Mar. 1, 2012

Related U.S. Application Data (60) Provisional application No. 61/378,292, filed on Aug. 30, 2010.

(51) Int. Cl.
*A47C 15/00* (2006.01)
(52) U.S. Cl.
USPC .......................................... 297/248; 297/232
(58) Field of Classification Search
USPC ...................... 297/232, 248, 378.1
See application file for complete search history.

(56) References Cited

U.S. PATENT DOCUMENTS

| | | | |
|---|---|---|---|
| 5,601,334 A | 2/1997 | Marks | |
| 5,788,324 A | 8/1998 | Shea et al. | |
| 5,951,084 A | 9/1999 | Okazaki et al. | |
| 6,264,261 B1 | 7/2001 | Krafcik | |
| 6,425,619 B2 | 7/2002 | Ney | |
| 6,582,016 B1 | 6/2003 | Kirchoff et al. | |
| 6,601,917 B1 * | 8/2003 | Christopherson | 297/253 |
| 6,827,388 B2 | 12/2004 | Kayumi et al. | |
| 6,869,121 B2 | 3/2005 | Kayumi et al. | |
| 6,983,526 B2 * | 1/2006 | Duffy et al. | 29/514 |
| 7,243,995 B2 * | 7/2007 | Nakaya et al. | 297/378.1 |
| 7,281,763 B1 | 10/2007 | Hayashi et al. | |
| 7,677,656 B2 | 3/2010 | Saberan et al. | |
| 7,699,396 B2 | 4/2010 | Ghisoni et al. | |
| 7,735,895 B2 | 6/2010 | Brown et al. | |
| 2006/0049622 A1 * | 3/2006 | Yamamoto | 280/801.1 |
| 2007/0158979 A1 * | 7/2007 | Saberan et al. | 297/47 |
| 2008/0111417 A1 * | 5/2008 | Ohta | 297/485 |
| 2008/0238162 A1 | 10/2008 | Suzuki et al. | |

FOREIGN PATENT DOCUMENTS

JP    2003127722    5/2003

OTHER PUBLICATIONS

International Search Report and Written Opinion of PCT/US2011/046585 filed Jan. 5, 2012.

* cited by examiner

*Primary Examiner* — Philip Gabler
(74) *Attorney, Agent, or Firm* — Rankin, Hill & Clark LLP (57) ABSTRACT

A multi-row vehicle seating arrangement includes a second row of vehicle seats including a first lateral side seat, a second lateral side seat, and a center seat disposed between the first and second lateral side seats. The center seat has a pair of spaced apart seat anchors fixably secured thereto for securing a child seat to the center seat.

21 Claims, 7 Drawing Sheets

SEATING ARRANGEMENT FOR A VEHICLE

This application claims the benefit of U.S. Provisional Patent Application Ser. No. 61/378,292, filed Aug. 30, 2010, which is incorporated by reference in its entirety herein.

BACKGROUND

The present disclosure generally relates to vehicle seats and seating arrangements for vehicles, and particularly relates to a center seat disposed between first and second side seats in a vehicle and a seating arrangement including such a center seat.

Several vehicle types, such as minivans and SUVs, come equipped with multiple rows of vehicle seats, including a first row of seats for the vehicle driver and a front seat passenger, a second row of seats disposed immediately behind the first row, and a third row of seats disposed behind the second row of seats. Often, one or two vehicle doors are provided adjacent the second row of seats, but not adjacent the third row of seats. This necessitates occupants using the third row of seats to enter a door adjacent the second row of seats and maneuver back to the third row of vehicle seats and later maneuver forward past the second row of seats and exit a door adjacent the second row of seats. To facilitate such ingress and egress to and from the third row of seats, the second row of seats, or one or more seats thereof, can be equipped to tilt and/or slide forward to provide more access room. Additionally, the second row of seats can be provided with a gap between right-side and left-side seats allowing passengers to access the third row by passing in the gap between the seats of the second row of seats.

Sometimes, an auxiliary vehicle seat can be provided as part of the second row of seats and disposed between the lateral side seats of the second row of seats. This axillary seat is typically smaller than the adjacent lateral side seats and is sometimes removable. Production vehicles having removable independent second row center seats are generally not equipped with isofix anchors for attaching a child seat to the center seat. This is primarily because the center seat is typically not wide enough to adequately carry a child seat.

SUMMARY

According to one aspect, a center seat disposed between a pair of side seats in a vehicle seating arrangement includes a seat base, a seat back extending upward from the seat base, and spaced apart seat anchors respectively disposed adjacent lateral sides of the seat base and seat back for securing a child seat.

According to another aspect, a vehicle seating arrangement includes a first side seat, a second side seat, and a center seat disposed between the first and second side seats, the center seat including a pair of spaced apart seat anchors disposed adjacent lateral sides of the center seat.

According to a further aspect, a multi-row vehicle seating arrangement includes a second row of vehicle seats including a first lateral side seat, a second lateral side seat, and a center seat disposed between the first and second lateral side seats. The center seat has a pair of spaced apart seat anchors fixably secured thereto for securing a child seat to the center seat.

DETAILED DESCRIPTION

Figure 1:
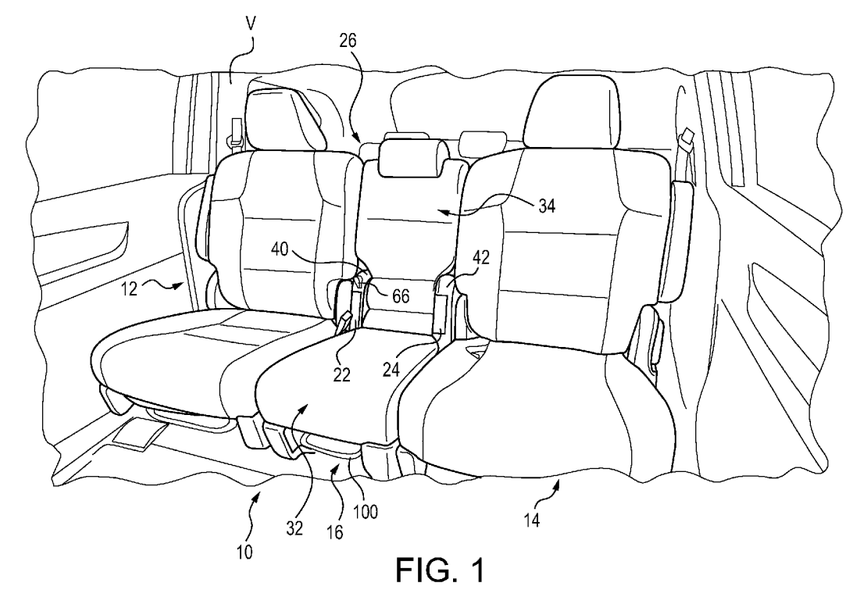
FIG. 1 is a perspective view of a row of vehicle seats (e.g., a second row of vehicle seats) including a first side seat, a second side seat, and a center seat disposed between the first and second side seats.

Referring now to the drawings wherein the showings are for purposes of illustrating one or more exemplary embodiments and not for purposes of limiting same, FIG. 1 shows a multi-row seating arrangement 10 for a vehicle (e.g., minivan, van, crossover, sport utility etc.) according to an exemplary embodiment. The illustrated seating arrangement 10 includes a first lateral side seat 12, a second lateral side seat 14, and a center seat 16 disposed between the first and second side seats 12, 14. As will be described in more detail below, the center seat 16 can include a pair of spaced part seat anchors 18, 20 (FIGS. 3 and 7-9) disposed beneath removable covers or anchor caps 22, 24 and adjacent lateral sides of the center seat 16. The anchors 18, 20 are fixedly secured to the center seat 16, and particularly to a frame thereof, for securing a child seat to the center seat 16.

In the illustrated embodiment, the first side seat 12, the second side seat 14, and the center seat 16 are disposed in a second row of vehicle seats within a vehicle V. For example, the second seating row can be disposed rearward of a front seating row (not shown) and forward of a rear seating row 26 in the vehicle V. As is known and understood by those skilled in the art, the center seat 16 can be removably disposed in the vehicle V. This allows the center seat 16 to be selectively removed from the vehicle V, which can allow for easier ingress and egress to and from the third row of seats 26. In particular, access to and from the third row of seats 26 can occur by a passenger passing between the lateral side seats 12, 14 of the second row of seats. Optionally, the center seat 76 can be removed and stored in the vehicle V or elsewhere, such as in a cargo area disposed behind the third row of seats 26.

Figure 14:
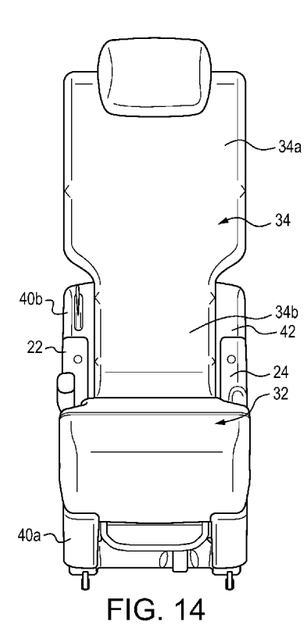
FIG. 14 is a front elevation view of the center seat.
Figure 15:
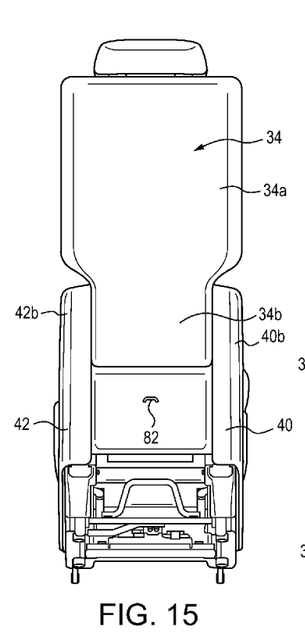
FIG. 15 is a rear elevation view of the center seat.
Figure 16:
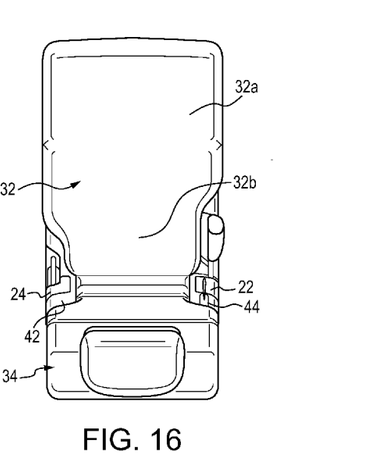
FIG. 16 is a top plan view of the center seat.

With additional reference to FIGS. 14, 15, and 16, the center seat 16 includes a seat base 32 and a seat back 34 extending upward from the seat base 32. As already mentioned, spaced apart seat anchors 18, 20 (e.g., shown in FIG. 7) are disposed adjacent lateral sides of the seat base 32 and the seat back 34 for securing a child seat (not shown) and are hidden behind the anchor covers 22, 24. In the illustrated embodiment, the center seat 16 is narrower than the first and second side seats 12, 14. More particularly, the seat base 32 and seat back 34 of the center seat 16 are narrower than the first and second side seats 12, 14. For example, the seat base 32 and seat back 34 can be less than about 75% a width of one or both of the pair of side seats 12, 14. If desired, the width of the center seat 16, and particularly the seat base 32 and seat back 34, can be less than about 65% the width of one or both of the first and second side seats 12, 14, less than about 55% the width of one or both of the first and second side seats 12, 14 (e.g., as shown in the illustrated embodiment), or narrow still. Having a narrower center seat 16 with anchors 18, 20 allows maximum comfort to be afforded to the first and second side seats 12, 14 while still providing child seat functionality to the center seat 16.

With continued reference to FIGS. 14-16, the seat back 34 includes an upper portion 34a and a lower portion 34b. As shown, the lower portion 34b can be narrower than the upper portion 34a. Moreover, the seat anchors 20, 22, which are disposed behind the covers 22, 24, flank the lower portion 34b and are disposed apart from one another a difference that is less than a width of the upper portion 34a. Similarly, the seat base 32 includes a forward portion 32a and a rearward portion 32b adjacent to seat back 34. In the illustrated embodiment, the rearward portion 32b is narrower than the forward portion 32a and the seat anchors 18, 20, which are disposed behind the covers 22, 24, flank the rearward portion 32b and are disposed apart from one another a difference that is less than a width of the rearward portion 32b.

The narrowed portions 32b, 34b of the seat base 32 and seat back 34 define recessed areas. Within the recessed areas defined by the narrowed portion 34b of the seat back 34, recliner covers 40, 42 are disposed. More particularly, the recliner covers 40, 42 flank lateral sides of the seat back 34 and extend below the seat base 32. In the illustrated embodiment, the recliner covers 40, 42 are L-shaped, though this is not required. In particular, the recliner covers 40, 42 each include respective lower portions 40a, 42a and upper portions 40b, 42b. The lower portions 40a, 42a are disposed laterally outwardly relative to the rearward portion 32b of the seat base 32 and extend underneath in supporting relation to the forward portion 32b of the seat base 32. The upper portions 40b, 42b extend adjacent lateral sides of the seat back 34, particularly adjacent the narrowed lower portion 34b in flanking relation. The upper portions 40b, 42b terminate adjacent respective transition areas between the upper portion 34a and lower portion 34b of the seat back. As shown, the recliner covers 40, 42 have outer lateral sides that are in lateral alignment with outer lateral sides of the upper portion 34a of the seat back 34.

Figure 2:
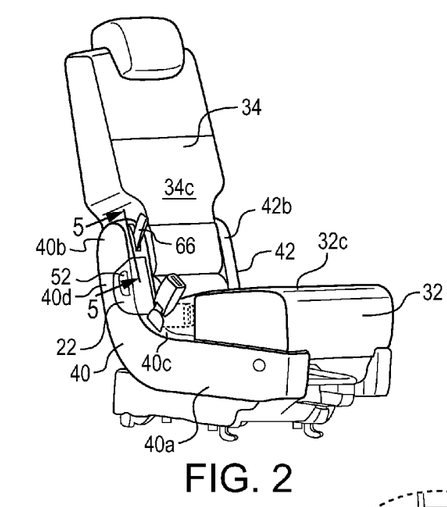
FIG. 2 is a perspective view of the center seat shown removed from the row of vehicle seats.
Figure 3:
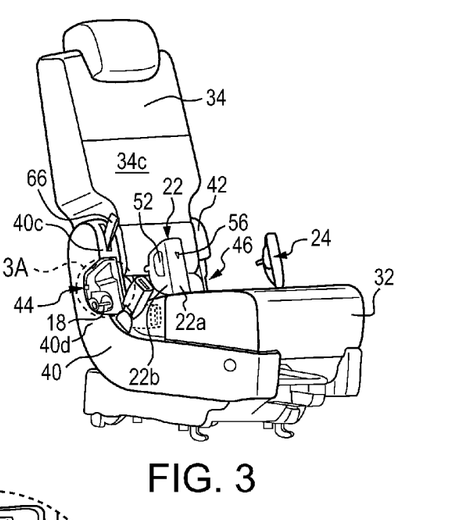
FIG. 3 is another perspective view of the center seat shown with isofix anchor covers exploded/removed from the vehicle seat.
Figure 3A:
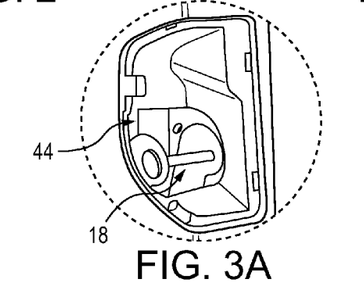
FIG. 3A is an enlarged perspective view of an isofix anchor of the center seat.
Figure 5:
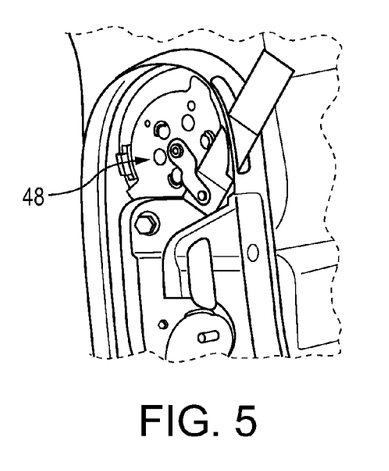
FIG. 5 is a sectional view strike through at the line 5-5 of FIG. 2 showing a recline mechanism of the center seat.

With additional reference to FIGS. 2, 3 and 3A, each of the pair of anchors 18, 20 is disposed within a corresponding recessed portion 44, 46 of the recliner covers 40, 42 and the recessed portions 44, 46 are respectively covered or housed by the removable covers 22, 24. More particularly, the anchor covers 22, 24 are removably disposed over each of the anchors 18, 20. When secured in closing the recessed portions 44, 46, the caps or covers 22, 24 form a portion of the recliner covers 40, 42, which are disposed over recline or reclining mechanisms 48 (FIG. 5) for the center seat 16. The pair of anchors 18, 20 flank lateral sides of the center seat 16, and particularly flank lateral sides of the seat base 32 and seat back 34, and more particularly flank the respective portions 32b, 34b of the seat base 32 and seat back 34. As shown, the spaced apart seat anchors 18, 20 can be located in vertical alignment with an upper surface 32c of the seat base 32 or slightly elevated relative to the seat base 32, and particularly relative to the upper surface 32c of the seat base 32.

As best shown with respect to the cover 22, each of the removable covers 22, 24 has an exterior surface that is contiguous with an exterior or outer surface of a corresponding one of the recliner covers 40, 42. More particularly, the exterior surface of the covers 22, 24 is generally convex and includes a forward facing portion (e.g., 22a) and a lateral facing portion (e.g., 22b). The forward facing portion (e.g., 22a) is contiguous with a forward facing portion of the recliner cover (e.g., forward facing portion 40c of recliner cover 40), and the lateral facing portion (e.g., 22b) is contiguous with a lateral facing portion of the recliner cover (e.g., lateral facing portion 40d of the recliner cover 40). This arrangement provides a clean look for the center seat 16.

As shown in the illustrated embodiment, and particularly with respect to the cover 22, each of the anchor covers 22, 24 can include a finger recess or grip 54 disposed in the lateral surface (e.g., 22b) for facilitating gripping and removal of the anchor cover 22, 24. To remove the covers 22, 24, a user pulls on the covers, in particular the finger recess 52, to release the covers 22, 24 from the recliner covers 40, 42. The finger recesses or grips 52 can be disposed on outer lateral sides of the covers 22, 24. This can help maintain a clean seat profile and/or reduce the risk of injury to the user. In addition, as will be described in more detail below, this design allows for easy installation of a CFR fixture, such as a child seat.

As best shown in FIG. 3, each of the anchor covers 22, 24 can include an isofix, indicia, or mark 56 thereon. Having the isofix, indicia, or mark 56 on the covers 22, 24 makes them easily visible for the user because the covers 22, 24 are not covered or otherwise hidden by the seat base 32 or seat back 34. In one embodiment, the isofix, indicia, or marks 56 can be integrally molded into the covers 22, 24, though this is not required (e.g., any other indicia or marking could be used to indicate that the isofix anchors are below the covers, such as labels, paint, etc.). In any case, once the covers 22, 24 are removed, accessing the isofix anchors 18, with a child seat latch or tether is easy because no components of the seat hinder access or attachment. In addition, with the covers 22, 24 removed, customer comfort is not reduced because the anchors 18, 20 are recessed or disposed below an upper or forward surface 34c of the seat back 34.

Figure 4:
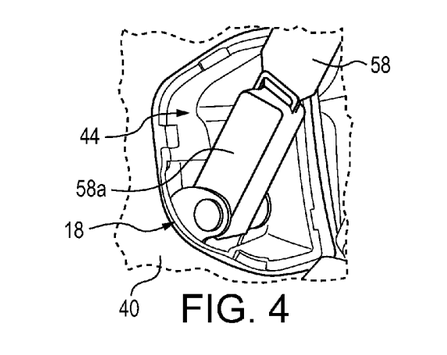
FIG. 4 is an enlarged perspective view of the isofix anchor, similar to FIG. 3a, but showing a tether (e.g., from a child seat) clamped to the isofix anchor.

With reference to FIG. 4, a tether 58, such as from a child seat (not shown), is shown secured to the anchor 18. More particularly, a tether latch 58a of the tether is latched to the anchor 18. As will be appreciated, the anchor cover 22 has already been removed to reveal the recessed portion 44 of the recliner cover 40. The recessed portion 44 (i.e., the recliner cover opening) can be designed or dimensioned, as shown, to allow easy installation of child seat tethers, such as illustrated tether 58 and tether latch 58a. In particular, the recessed portion 44 can be dimensioned to allow a tether attachment of an associated device (e.g., a child seat) to be secured to the anchor 18 without interference. As will be described in more detail below, the center seat 16 is able to achieve a minimum seat width while maintaining substantial room for installation of a child seat.

Figure 6:
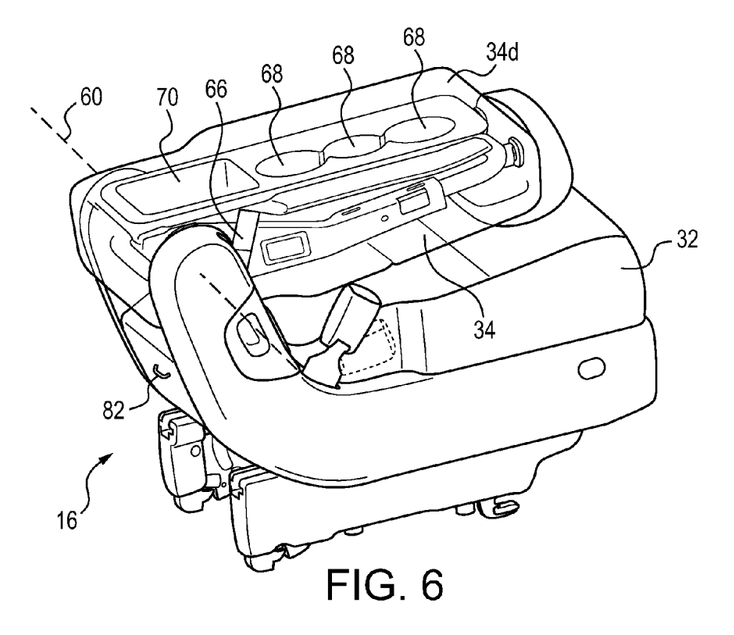
FIG. 6 is a perspective view of the center seat shown with the seat back portion folded over onto the seat cushion portion.

With reference now to FIG. 6, the center seat 16 can have a high recline axis 60 (i.e., the axis about which the seat back 34 pivots relative to the seat base 32). This can allow the seat back portion 34 of the center seat 16 to be folded over onto the seat base 34 of the center seat 16 and be used as an armrest of the first and/or second side seats 12, 14. Additionally, as shown, an actuator, such as illustrated lever 66, can be provided and operatively connected to the reline mechanism 48 for releasing the seat back 34 from a locked state and allowing the seat back 34 to be folded over onto the seat base 32. More specifically, lifting of the lever 66 allows free angular or rotational movement of the seat back 34 relative to the seat base 32. Accordingly the user can pull the lever 66 and simultaneously manipulate the seat back 34 pivotally onto the seat base 32. Advantageously, the folded-over seat back 34 can be used as an arm rest and is provided in a convenient location for occupants of the lateral side seats 12, 14 due to the high recline axis 60. Optionally, additional functionality can be provided by the seat back 34. For example, as shown in the illustrated embodiment, cup holders 68 and a tray 70 can be defined in a rear side 34d of the seat back 34, which provides additional functionality to the first and second side seats 12, 14. Of course, other arrangements and recessed features can be provided in the rear side 34d of the seat back 34 than those illustrated.

Figure 7:
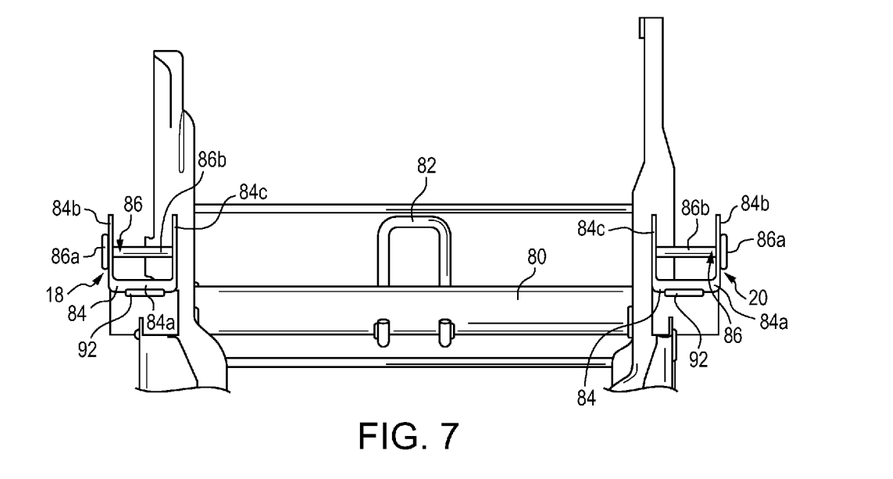
FIG. 7 is a schematic (partial) elevational view of a cushion frame of the center seat showing isofix anchors secured to a mainframe member of the cushion frame.
Figure 8:
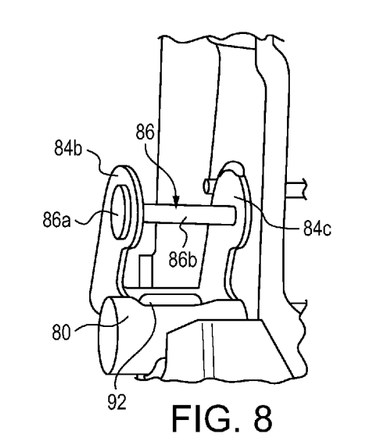
FIG. 8 is an enlarged perspective view of one of the isofix anchors of the cushion frame, the anchor including a mounting bracket and a wire portion.
Figure 9:
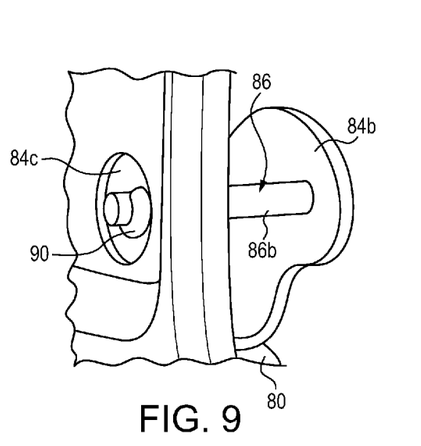
FIG. 9 is an enlarged perspective view of another of the isofix anchors of the cushion frame.

With reference to FIGS. 7, 8, 9, the center seat 16, and particularly the seat base 32, can include a main frame member 80 that is part of a cushion frame of the seat base 32. The main frame member 80 extends laterally along a rear of the seat base 32 adjacent to seat back 34. The anchors 18, 20 can be secured to the main frame member 80. In addition, a tether anchor 82 can be secured to the main frame member 80 between the anchors 18, 20, such as centrally between the anchors 18, 20. With brief additional reference to FIG. 15, the tether anchor 82 can be disposed at a rear of the center seat 16 and can protrude through an opening defined in a rear side of the seat base 32. As is known and understood by those skilled in the art, a center tether strap of a child seat (not shown) or other device can be wrapped around the seat back 34 and connected to the tether anchor 82, such as when installing a child seat and securing same to the center seat 16.

As shown, each anchor 18, 20 can be comprised of a mounting or attachment bracket 84 and a wire portion 86. The mounting bracket 84 of each anchor 18, 20 can be fixably secured to the main frame member 80 and the wire portion 86 can be supported by the mounting bracket 84 in spaced relation relative to the main frame member 80. In particular, in the illustrated embodiment, the mounting bracket 84 can be generally U-shaped having a base portion 84a and two spaced apart leg portions 84b extending from the base portion 84a. As shown, the wire portion 86 is secured to distal ends of the spaced apart leg portions 84b, 84c. Each wire portion 86 can include a head portion 86a and a shaft portion 86b. The shaft portion 86b of each wire portion passes through respective ones of the legs 84b, 84c of the mounting brackets 84 and the head portions 86a abut the outer lateral legs 84b. Distal ends of the shaft portions 86b can be secured to the inner lateral legs 84c, such as by welding 90 (FIG. 9).

Figure 10:
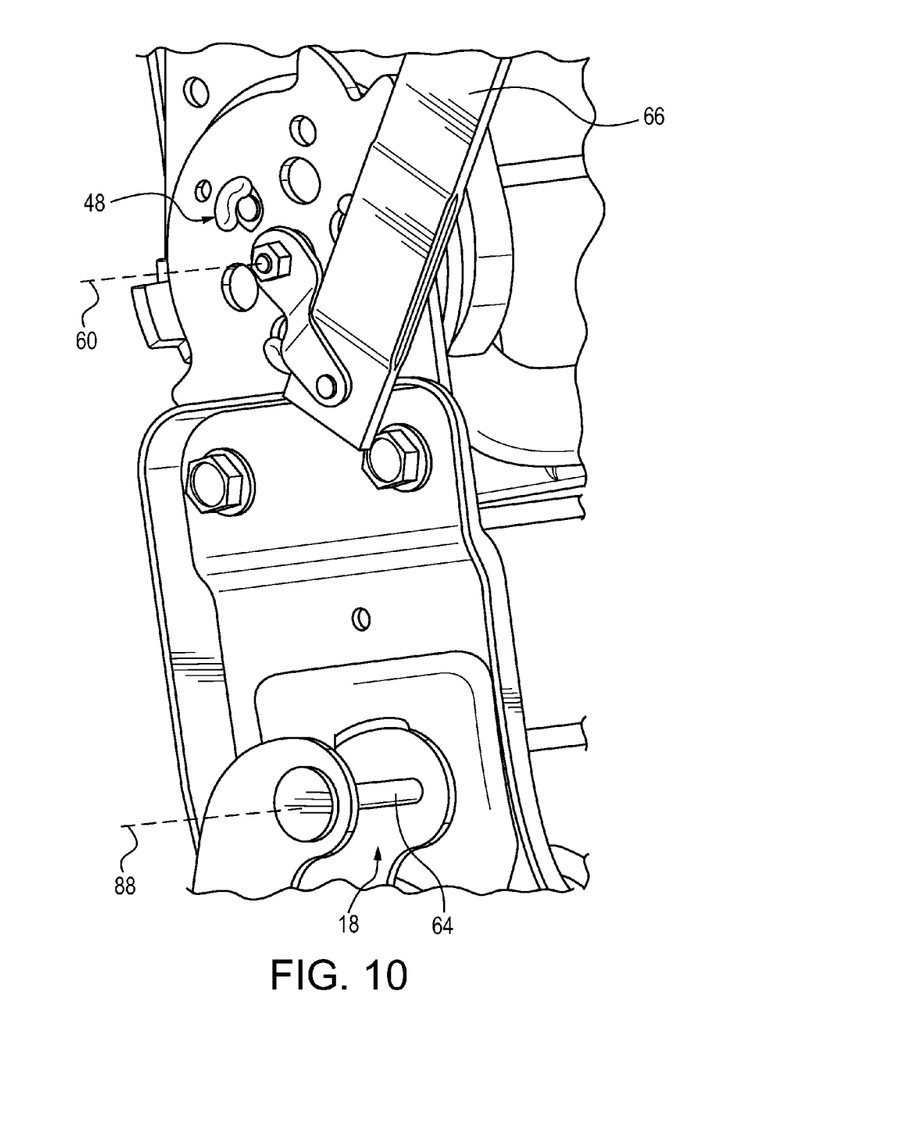
FIG. 10 is a schematic perspective view showing relative positioning between one of the isofix anchors of the cushion frame and a recliner center of the center seat.

With further reference to FIG. 10, relative positioning between the high recline axis 60 and an axis 88 defined by the wire portions 86 is shown. In one embodiment, the relative spacing between the axes 60, 88 can be 123 mm. Since the wire portions 86 are spaced apart and upward from the main frame member 80, it will be understood that the axis 60 is also positioned above an axis of the main frame member 80 (i.e., the main frame member 80 and an axis defined thereby are disposed vertically below the axis 60).

To assemble the anchors 18, 20, each wire portion 86, and particularly a distal end of the shaft portion 64b, is first press fit through the apertures defined in the leg portions 84b, 84c. Then, the distal end of the shaft portion of 64b can be welded via welding 90 to its respective leg portion 84c. The head portion 64a rests or abuts against the leg portion 84b and limits axial insertion of the wire portions 86 into the leg portions 84b, 84c of the mounting brackets. This configuration advantageously requires the wire portion 64 to be welded to the mounting bracket 84 at only one end. The combination of the wire portion 64 and the mounting bracket 84 can be fixedly secured to the main frame member 80, such as by welding 92.

Figure 11:
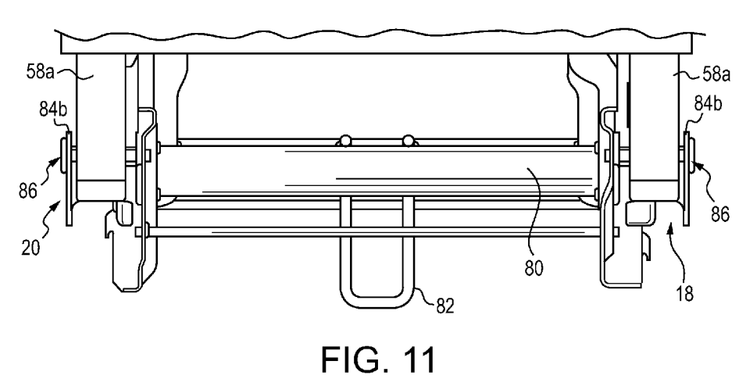
FIG. 11 is a schematic (partial) plan view of the cushion frame shown with tethers attached to the isofix anchors and showing a rear tether anchor.
Figure 12:
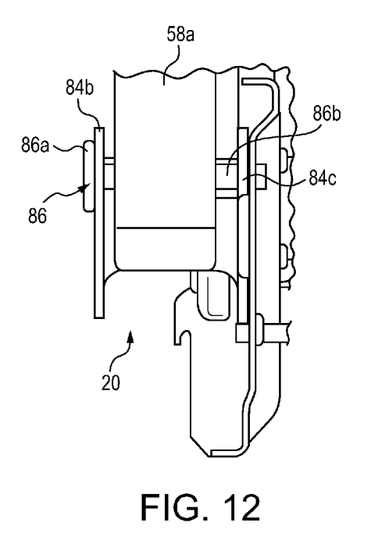
FIG. 12 is an enlarged view of one of the tethers attached to one of the anchors.
Figure 13:
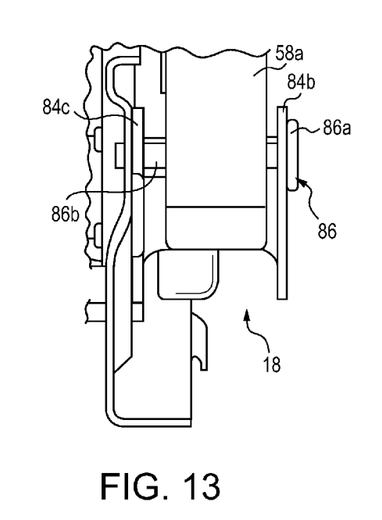
FIG. 13 is an enlarged view of another of the tethers attached to another of the anchors.

Advantageously, this construction allows the center seat 16 to meet the minimum requirement for a child seat installation (e.g., the length of the wire portion 64 and/or the distance between the anchors 18, 20 is sufficient to meet minimum requirements for CFR installations, such as a child seat). More particularly, and with additional reference to FIGS. 11, 12 and 13, outer lateral sides or ends of the anchors 18, 20 are formed by the outer lateral legs 84b of the mounting brackets 84. In the illustrated embodiment, these legs 84b of the two brackets 84 are spaced apart by approximately 309 mm. The wire portions 86 of the anchors 18, 20 can each have anchor portions (i.e., portions to which a child seat tether latch attachable) sufficient to enable easy attachment of latches 58a of tethers 58. In the illustrated embodiment, these widths are approximately 32 mm. Such sizing (e.g., 32 mm of anchor portion) can allow for approximately 2.1 mm of clearance between outer sides of the tether latches 58a and the legs 84b, 84c of the mounting brackets 84. More specifically, as shown, tether latches 58a can be attached to the anchors 18, 20, and specifically attached to wire portions 86 of the anchors 18, 20, and have 2.1 mm of clearance between the legs 84b, 84c. This allows for relatively easy installation of the tether latches and disconnection of same.

Returning reference to FIG. 1, an additional feature of the center seat 16 is that it can be independently slidable in a longitudinal direction (i.e., a direction of travel for the vehicle V) relative to the first and second side seats 12, 14. In particular, the center seat 16 can be disposed on rails (not shown) that allow the center seat 16 to be slidably moved in the longitudinal direction within the vehicle V. For releasing the center seat 16 from a longitudinally latched or locked position, a slide adjust or towel bar 100 can be disposed beneath the seat base 32 toward a forward end thereof. As is known and understood by those skilled in the art, the bar 100 can operate a slide adjuster (not shown) of the center seat 16. In operation, a user simply pulls the bar 100 towards the seat base 32 and then slides the seat 16 to a desire position.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A center seat disposed between a pair of side seats in a vehicle seating arrangement, comprising:
   a seat base;
   a seat back extending upward from the seat base;
   at least one reclining mechanism secured to the center seat for allowing the seat back to be moved relative to the seat base;

spaced apart seat anchors respectively disposed adjacent outer lateral sides of the seat base and seat back for securing a child seat; and a pair of recliner covers provided on at least the outer lateral sides of the seat back, at least one of the recliner covers disposed over the at least one reclining mechanism, the seat anchors housed by the recliner covers.

2. The center seat of claim 1 wherein the seat base and seat back are less than about 75% a width of one or both of the pair of side seats.

3. The center seat of claim 1 wherein the seat back includes an upper portion and a lower portion, the lower portion narrower than the upper portion, and wherein the spaced apart seat anchors flank the lower portion.

4. The center seat of claim 3 wherein the spaced apart seat anchors are located in vertical alignment with an upper surface of the seat base or slightly elevated relative to the seat base.

5. The center seat of claim 3 wherein the seat base includes a forward portion and a rearward portion adjacent the seat back, the rearward portion narrower than the forward portion.

6. The center seat of claim 3 wherein the pair of recliner covers flank the lower portion of the seat back, the recliner covers having outer lateral sides that are in lateral alignment with outer lateral sides of the upper portion of the seat back.

7. The center seat of claim 1 wherein each of the seat anchors is disposed within a recessed portion of a respective one of the recliner covers and the recessed portion is covered by a removable cover of the recliner cover.

8. The center seat of claim 7 wherein the removable cover has an exterior surface that is contiguous with an outer surface of the recliner cover.

9. The center seat of claim 8 wherein the exterior surface of the removable cover is generally convex and includes a forward facing portion and a lateral facing portion, the forward facing portion is contiguous with a forward facing portion of the recliner cover and the lateral facing portion is contiguous with a lateral facing portion of the recliner cover.

10. The center seat of claim 9 wherein the removable cover includes a finger recess disposed in the lateral facing portion for facilitating gripping and removal of the removable cover.

11. The center seat of claim 1 further including:

an anchor cover or cap removably disposed over each of the spaced apart seat anchors.

12. The center seat of claim 11 wherein the anchor cover or cap includes a finger recess for facilitating gripping and removal of the removable cover.

13. The center seat of claim 11 wherein the anchor cover or cap includes indicia integrally molded thereon for identifying the location of the seat anchor under the anchor cover or cap.

14. The center seat of claim 1 further including a tether anchor disposed at a rear of the seat cushion and accessible from behind the seat back, the tether anchor secured to a frame member of the seat cushion.

15. The center seat of claim 1 further including:

a cushion frame main frame member extending laterally along a rear of the seat base, the seat anchors secured to the main frame member.

16. The center seat of claim 15 wherein an axis of the main frame member is disposed vertically below a pivot axis about which the seat back pivots relative to the seat base.

17. The center seat of claim 15 further including:

a tether anchor secured to the main frame member between the seat anchors.

18. The seating arrangement of claim 15 wherein each of the seat anchors includes a mounting bracket and a wire portion, the mounting bracket fixedly secured to the main frame member and the wire portion supported by the mounting bracket in spaced relation relative to the main frame member.

19. The seating arrangement of claim 18 wherein the mounting bracket is generally U-shaped having a base portion secured to the main frame member and two spaced apart leg portions extending from the base portion, the wire portion secured to distal ends of the spaced apart leg portions.

20. The seating arrangement of claim 1 wherein the center seat has a high recline axis allowing the seat back to be folded over the seat cushion.

21. A multi-row vehicle seating arrangement, comprising:

a second row of vehicle seats including a first lateral side seat, a second lateral side seat and a center seat disposed between the first and second lateral side seats, the center seat having a seat back and a seat base, the seat base including a forward portion and a rearward portion adjacent the seat back, the rearward portion narrower than the forward portion, the center seat further having a pair of spaced apart seat anchors fixedly secured thereto for securing a child seat to the center seat, the center seat further including a pair of recliner covers flanking outer lateral sides of the seat back of the center seat, the seat anchors spaced from the seat base of the center seat such that the seat anchors are not disposed directly over the rearward portion of the seat base, the seat anchors extending outwardly from the outer lateral sides of the seat back of the center seat and housed by the recliner covers.

* * * * *